(12) United States Patent
Griffin

(10) Patent No.: US 7,749,395 B2
(45) Date of Patent: Jul. 6, 2010

(54) APPARATUS AND METHODS FOR SEPARATING LIQUID FROM A WASTE PRODUCT

(75) Inventor: William Tid Smith Griffin, Hawesville, KY (US)

(73) Assignee: Gryphon Environmental, LLC, Hawesville, KY (US)

( * ) Notice: Subject to any disclaimer, the term of this patent is extended or adjusted under 35 U.S.C. 154(b) by 587 days.

(21) Appl. No.: 11/755,897

(22) Filed: May 31, 2007

(65) Prior Publication Data

US 2007/0278143 A1 Dec. 6, 2007

Related U.S. Application Data

(60) Provisional application No. 60/810,043, filed on Jun. 1, 2006.

(51) Int. Cl.
B01D 29/00 (2006.01)

(52) U.S. Cl. ............... 210/774; 210/181; 210/416.1; 210/406

(58) Field of Classification Search ........... 210/767, 210/774, 802, 175, 181, 416.1, 406, 428
See application file for complete search history.

(56) References Cited

U.S. PATENT DOCUMENTS

| 2,027,876 | A | * | 1/1936 | Pennebaker | 210/183 |
| 3,929,648 | A | * | 12/1975 | Cuthbert | 210/445 |
| 4,569,762 | A | * | 2/1986 | Gaudfrin | 210/401 |
| 6,632,371 | B2 | | 10/2003 | Olson | |
| 2002/0113014 | A1 | | 8/2002 | Stroup | |
| 2003/0057148 | A1 | * | 3/2003 | Zuk, Jr. | 210/445 |

FOREIGN PATENT DOCUMENTS

| WO | WO 96/05144 | * | 2/1996 |
| WO | WO 03/037805 | * | 5/2003 |
| WO | WO 03/086571 | | 10/2003 |

* cited by examiner

*Primary Examiner*—Fred Prince
(74) *Attorney, Agent, or Firm*—King & Schickli, PLLC

(57) ABSTRACT

An apparatus removes liquid from a liquid and solids mixture. The apparatus may include a bowl-shaped, rigid container having an upper portion, a lower portion, and a sidewall forming a chamber for receiving the liquid and solids mixture. The container includes a plurality of conduits extending radially outwardly along an inner portion of the sidewall. A filter separates the conduits from the liquid solids mixture in the chamber. Means is also provided for reducing pressure in the chamber, which causes at least liquid to be drawn from the mixture through the filter and conduits. Related systems and methods may be follow from use of the apparatus.

20 Claims, 5 Drawing Sheets

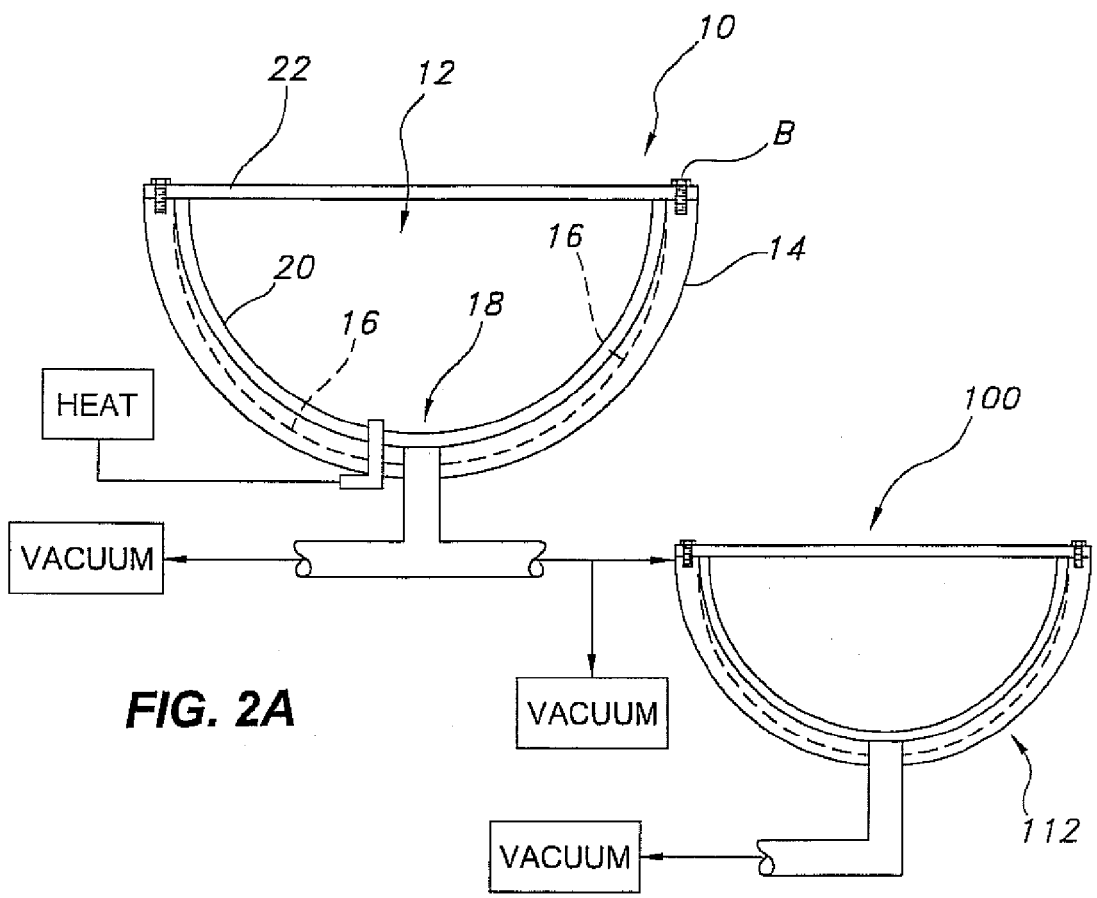
FIG. 2A
FIG. 2B
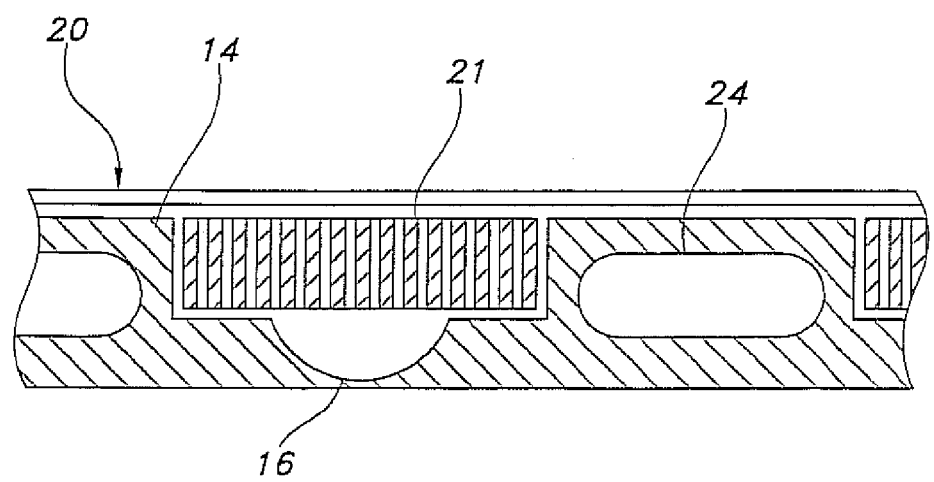
FIG. 3

US 7,749,395 B2

APPARATUS AND METHODS FOR SEPARATING LIQUID FROM A WASTE PRODUCT

This application claims the benefit of U.S. Provisional Patent Application Ser. No. 60/810,043, filed Jun. 1, 2006, the disclosure of which is incorporated herein by reference.

COPYRIGHT STATEMENT

A portion of the disclosure of this document contains material subject to copyright protection. No objection is made to the facsimile reproduction of the patent document or this disclosure as it appears in the Patent and Trademark Office files or records, but any and all rights in the copyright(s) are otherwise reserved.

TECHNICAL FIELD

The present invention relates generally to separating a liquid from a liquid-solid mixture and, in particular, to an apparatus and methods for separating a liquid, such as water, from a waste product, such as sludge.

BACKGROUND OF THE INVENTION

Waste products present expensive disposal problems to the industries that generate them. Unprocessed waste products typically cannot be disposed of in landfills due to regulations on water content. Even with more permissive regulations, it is much more expensive to transport and dispose of unprocessed waste products than just solid components because transportation charges correspond to weight.

Additionally, the scope of potential uses of such waste products is often substantially increased by removal of the liquid component from the solid component. Typically, the value of the dry solids arises from the decrease in weight occasioned by the removal of the liquid fraction, which leads to decreased disposal and transportation costs. Additionally, the recovered dried solids may be commercially valuable, such as if they are useable in other industrial applications (e.g., as filler in concrete mixtures) or can be sold in secondary markets, such as in the case where the waste products comprise coal or mineral slurries.

Unfortunately, efforts to work around the waste disposal problems often employ methods lacking environmental soundness. For example, many industries dump waste products, such as sludge, into holding ponds, which are typically enormous concrete or plastic lined, man-made pools. The waste products then sit in these sludge ponds while the solid materials settle at the bottom over time with the aid of only gravity. Aside from being a slow process, the potential for the pool lining to fail to fail or result in contamination of the surrounding environment makes this a less-than-desirable solution in terms of both efficiency and environmental impact.

Industrial sludge ponds suffer from significant practical difficulties. To begin, sludge ponds have a poor resulting yield (dry solid percentage content). Being passive, it also takes a long time to separate water from solids for a given volume of sludge, as compared to devices that rely on active separation. Keeping up with the output for any given waste flow rate requires a greater area than if active separation systems are used. However, most active separation are expensive to make and are not readily scaled up or down to handle corresponding volumes of industrial waste flow rates. The lack of portability is also a significant limiting factor.

Accordingly, a need is identified for fast and efficient methods and devices for actively separating water from a waste product, and also to produce a resulting solid that is sufficiently dry for use in other applications.

SUMMARY OF THE INVENTION

In its broadest aspects, the present invention relates to apparatus and methods for separating liquids from mixtures of liquids and solids that substantially eliminate one or more of the problems arising from the limitations and disadvantages of the prior art. The invention is particularly suited for separating water or other liquids from solids in all types of waste products, including sludge wastes or slurries. Throughout this application, mixtures of solids and water may be referred to as a product or a suspension. This includes any combination of particulate matter (solids) suspended in or containing significant quantities of water or any other liquid. While it is envisioned that the primary use of the invention is to dewater waste products, it is anticipated that the device will be equally useful in any application that requires removal of liquids from any mixture of liquids and solids.

The invention involves providing a bowl-shaped container for receiving and at least temporarily holding the waste product, which may flow from an effluent discharge pipe or other source. The container may comprise a chamber or compartment bounded by an interior curved sidewall having plurality of graduated, arcuate conduits associated with a filter. A cover, such as a substantially air-tight, preferably semi-permeable pliable membrane, may be placed over the compartment including the product to form a chamber.

To draw liquid from the product in the container, a pressure differential is created in the chamber. In one particularly preferred embodiment, a vacuum is applied to the chamber within the container through the conduits, and the negative pressure causes the liquid component of the waste product to be forced through the filter and the conduits for recovery. The membrane may also act as a direct force or pressure on the effluent once the vacuum is applied.

The graduated design of the sidewall and conduits enable the same amount of volume at the upper portion of the apparatus as the lower portion near the drain. This results in a substantially equal vacuum pressure being applied to the entire surface area of the filter below the effluent and to the pliable, permeable or impermeable membrane above the effluent. The pliable cover acts to absorb the bulk of all vacuum pressure. By doing so, the entire force, over time, of the vacuum is applied to the effluent during the drying process. This force creates a pressurized internal processing chamber in which water evaporates at lower temperatures. With the additional application of external heat to the chamber, the apparatus can further reduce the water content of the effluent efficiently.

The vacuum may be released and pulled several times in order to achieve the desired level of dryness for the solid component of the product in the container. Additionally, heat may be employed to speed the separation process, and the product may also be mixed or agitated for this reason. In one embodiment of the invention, heat and vacuum are employed to remove the liquid component from the solid component of the product or suspension in a rapid fashion. Sensors and automatic release valves may be used to ensure that the internal pressure does not reach an unacceptably high level.

Once the solid component of the product in the container reaches a sufficient level of dryness, the membrane may be removed from the chamber. The dewatered or dried product should consist substantially of the solid component of the product, and may be removed from the container along with the membrane (such as by lifting the filter and any support structure (e.g., a screen or wire mesh) or vacuuming from above). Alternatively, an upper portion of the chamber may include a vacuum for drawing dried material from the lower portion of the chamber for recovery. In either case, once the recovery step is complete, the container is then once again ready to receive waste product. The removed product may then be subjected to further drying, if necessary for the proposed use.

BRIEF DESCRIPTION OF THE DRAWINGS

FIG. 1b is a partially cutaway side schematic view showing an exemplary arrangement of conduits associated with a container forming part of the apparatus of FIG. 1a;

FIG. 2a is a side schematic view illustrating in additional detail the apparatus of FIG. 1;

FIG. 2b illustrates a manner in which a system incorporating a plurality of the apparatuses for separating liquid from a waste product may be arranged;

FIG. 3 is a partially cross-sectional side view of the sidewall of one possible embodiment of the container for receiving the waste product and removing water therefrom;

DETAILED DESCRIPTION OF THE INVENTION

Figure 1A:
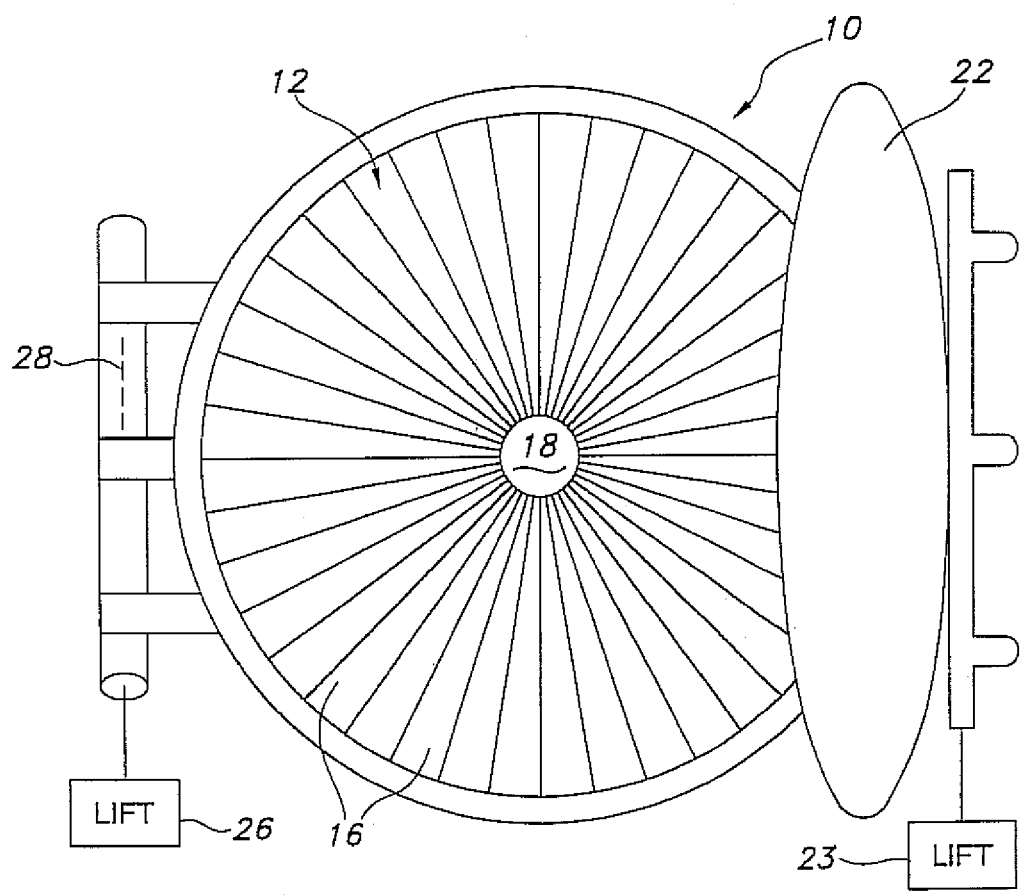
FIG. 1a is a schematic top view of one embodiment of the apparatus for separating liquid from a waste product forming one aspect of the invention.
Figure 1B:
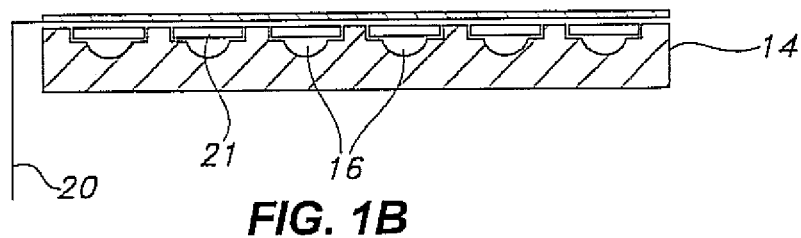
Figure 1C:
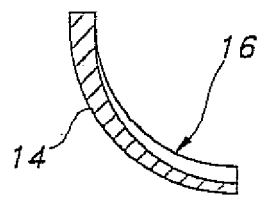
FIG. 1c is a partially cutaway cross-sectional view showing the manner in which a single conduit slopes in the vertical direction from an upper region or portion of the container to the lower portion.
Figure 4:
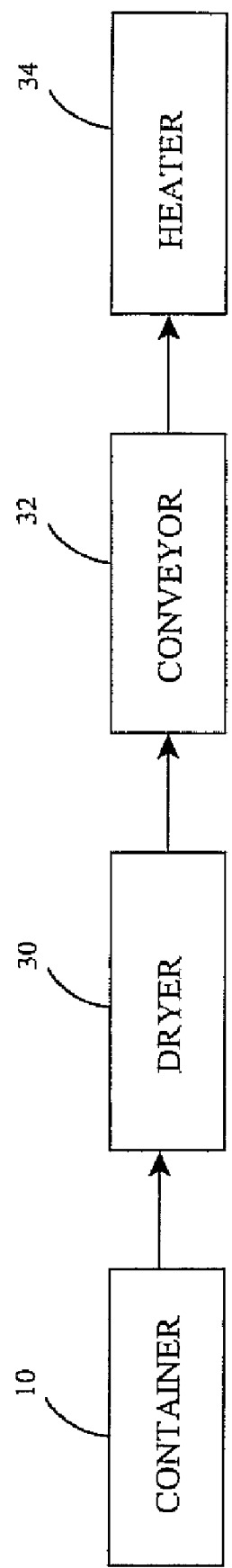
FIG. 4 is a block diagram illustrating the possible progression of steps in the course of treating a waste product using the apparatus forming one aspect of the invention.
Figure 6:
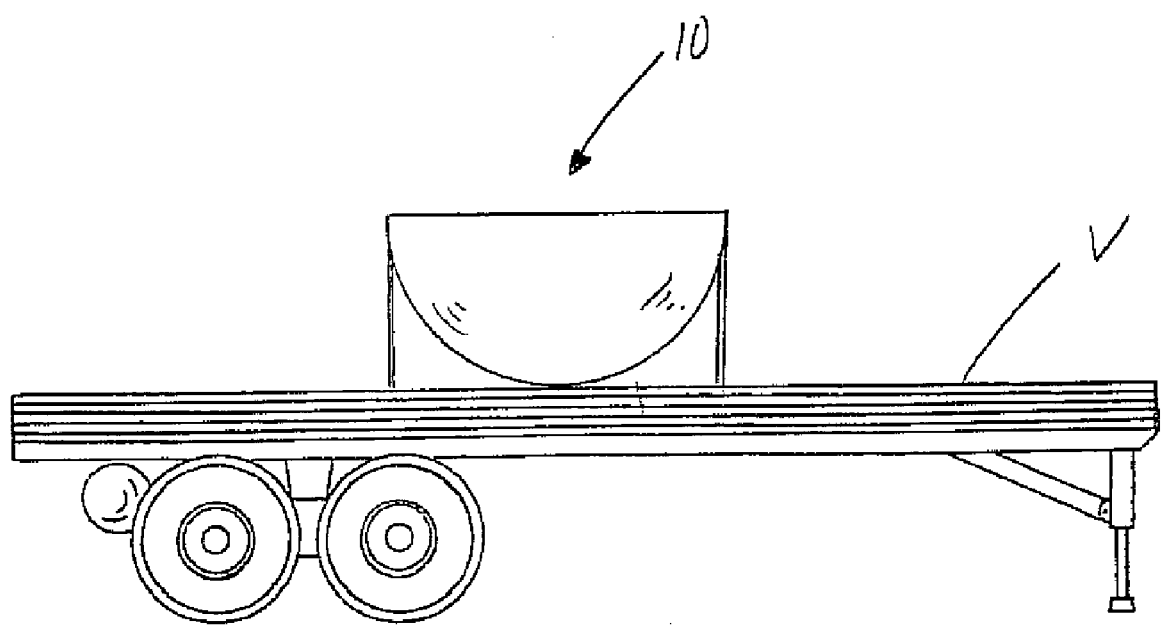
FIG. 6 shows an apparatus formed according to one aspect of the invention in combination with a vehicle.

FIGS. 1a-1c depict one aspect of the invention, which includes at least one low profile, relatively compact bowl-shaped container 10 for use at an industrial site that produces a waste product, such as sludge. The container 10 may be buried in the ground or, alternatively, may be above ground and associated with a suitable support structure, if necessary, to ensure stability. Still another option is to associate the container 10 with a vehicle V, such as a flatbed truck or trailer (see FIG. 6), such that it may be easily transported from one site to another and thus becomes portable.

As noted above, the container 10 is bowl-shaped, upstanding and preferably generally hemispherical with an open compartment or chamber 12 for receiving the product to be dried (i.e., dewatered). In a preferred embodiment of the invention, the chamber 12 is open at the top, and has a diameter of about ten feet or less. The container 10 can be made of any suitably strong material resistant to leaking and to reaction with the corresponding product. Examples of materials from which the container 10 may be constructed include concrete, plastic, steel, or other metal, with a preference for aluminum or stainless steel (primarily due to the superior corrosion resistance afforded).

In a preferred embodiment, the container 10 is constructed of stainless steel or aluminum and, most preferably, aluminum. Specifically, the container 10 may comprise prefabricated components of a size that permits easy transport to the industrial site. The components may then be assembled at the industrial site. If warranted by the projected rate of waste product produced by the industrial site, multiple chambers may be used. This arrangement has the benefit of providing alternative receptacles for when one is full and undergoing the drying cycle, and also allows for varying filter media to be used in a graded fashion (thus allowing separation of finer particles in sequential processing applications).

The container 10 includes a curved inner sidewall 14 having a plurality of conduits 16 formed therein. Preferably, the conduits 16 are generally arcuate, spaced apart grooves or channels formed in the sidewall 14 that, in view of the hemispherical nature, converge towards the bottom central region of the container 10. As a result, and as best shown in FIG. 1a, the conduits 16 generally form a sunburst pattern.

Most preferably, the conduits 16 are formed such that they are generally curved in cross-section and taper from a wider dimension adjacent an upper end or top of the sidewall 14 (e.g., 10 inches) to a narrower width dimension (e.g., 2 inches) adjacent the bottom, such as near the center. Also, as perhaps best understood with reference to the partially cutaway cross-sectional view of FIG. 1c, the conduits 16 preferably have a depth relative to the inner surface of the wall 14 adjacent the top of the container 10 that is infinitely small (i.e., approaching zero), and increase to a greater depth (e.g., 5 inches) adjacent the bottom. In any case, the conduits 16 serve to direct any fluid (water) or fluid suspension from the product in the container 10 to an outlet or drain 18 formed at or near the bottom center of the sidewall 14 for recovery.

As can be understood viewing FIG. 1b, which is a linear representation of the sidewall 14 (which would actually be curvilinear) to simplify illustrating the inventive concepts, a filter 20 overlies and separates the conduits 16 from the product in the chamber, and preferably also covers the opening or drain 18 through which the vacuum is drawn and the liquid recovered. This filter 20 can be any material suitable for blocking solid particulate matter from a suspension, thus holding the solid particulate matter in place, but that allows liquid from the suspension to pass through. In a preferred embodiment, the filter 20 comprises a sheet of selectively porous material, such as a synthetic polymer based fabric in the form of a woven geotextile. Other suitable filter materials useful for practicing the invention are well known to those skilled in the art, for example, any perforated or porous material. Of course, an important consideration when selecting a filter for use with this invention is the size of the particulate (solid) matter in the suspension to be separated. Finer particulate matter would require a finer mesh filter in order to prevent the particulate matter from passing through the filter with the water. The most preferred embodiment allows for micron-based filtration.

To prevent the filter material 20 from overly interfering with the flow of liquid in the conduits 16, it is also preferable to provide a rigid or semi-rigid but fluid pervious barrier material, such as a screen. This screen may be hemispherical in shape (now shown) and simply placed in the chamber 12 above or below the filter material 20, or instead may comprise individual inserts 21 for the container 10 that engage or overlie the conduits 16 (either above or below the filter material 20). The underlying conduits 16 may also be coated with an inert material, such as TEFLON, to reduce wear on the surface and flow resistance.

In a preferred embodiment, the container 10 including the waste product is covered in use. This covering may be accomplished using a sheet of covering material, such as a flexible or non-flexible membrane 22 to create a substantially air-tight seal with the open end of the container 10. In a preferred embodiment, the membrane 22 is a removable, flexible, substantially impermeable membrane made, for example, of natural or synthetic rubber, neoprene, or like rubber substances. In a most preferred embodiment, the membrane 22 is semi- or selectively permeable in order to allow some gas, such as ambient air, to pass through it. Other suitable membrane materials should be readily apparent to those skilled in the art.

Preferably, the membrane 22 is placed over the chamber 12 and fastened to the upper end of the sidewall 14 (which as shown may be substantially planar) using a substantially airtight means, for example, using bolts B (see FIG. 2*a*) or any other suitable fastening means (and possibly in further connection with seals, adhesives gaskets, or the like). The membrane 22 may also be mounted to a frame, which in turn may associated with means for positioning the membrane relative to the open end of the container 10 (such as a hydraulic lift 23 or the like for pivoting the frame and membrane together as a unit; see FIG. 1*a*).

When a pressure differential is created in the chamber 12, such as by pulling a vacuum through the outlet or drain 18 using a pump, motor, or the like with the membrane 22 in place (see FIG. 2*a*) the differential pressure is substantially evenly distributed across the surface of the contents through the conduits 16 as a result of the bowl-shaped design. In this way, the membrane 22 and the vacuum applied to the inside of the container 10 act together as a means to decrease pressure therein to create a differential pressure and consequently "squeeze" the contents of the chamber 12. This applied squeezing forces liquid, such as water, from the chamber 12, through the filter 20, into the conduits 16, and through the drain 18 for recovery. However, the solids for the most part are prevented from passing as the result of the filter 20 and any screen(s) 21 present. The liquid fraction recovered may then undergo further processing, such as polishing, for use in other applications.

Heat may be provided for increasing the temperature of the product contained in the chamber 12. In many applications, heating the product speeds the rate of drying by both increasing the rate of filtration and increasing the rate of evaporative drying. Furthermore, as pressure decreases the vaporization point of all liquids, the negative pressure enables low levels of induced heat to turn liquids into gas and be safely removed from the effluent. The heating element may be an electric resistive heating element, a gas heater, or any other suitable heating means. In a preferred embodiment, as shown in the partially exploded, cutaway, top view of FIG. 3, the heating element consists of one or more delivery lines 24 embedded in the sidewall 14 of the chamber 12, such as between the conduits 16, thus allowing steam or heated fluids to be circulated to elevate the temperature of the product contained therein. However, as indicated in FIG. 2*a*, the heat could also be supplied by lines positioned in and/or extending along the inside of the chamber 12. In either case, it should be appreciated that the applied heat may further effect drying through the partial evaporation of the liquid content.

The process of pulling a vacuum for a time, then releasing the vacuum, may be repeated several times as required until the remaining solids are sufficiently dry for their intended purpose. If a drier product is required, the process may need to be repeated for some time. Often, however, some remaining moisture is desirable, especially for products containing finer particulate matter, so that the fine solids can be unloaded and transported with minimal spillage (that is, the remaining moisture serves as a binder). Before initiating the any vacuum, it is also of course possible to allow for gravity to effect naturally some initial liquid separation, which of course saves energy.

Sensors and pressure release valves may be associated with the chamber 12 to prevent dangerous internal pressure levels from occurring. These valves may be set electronically depending on the substances being processed and their combustion point. For instance, in municipal waste processing, methane within the effluent that is under direct pressure and heat may become volatile at certain levels. The pressure sensors may be used to detect this and trigger the release valves to open and reduce the internal pressure.

Once the product is sufficiently dried, it may be removed from the chamber 12. This may be accomplished by removing the membrane 22 and then simply scooping out the product. However, the compact, low-profile nature of the bowl-shaped container 10 of the invention also allows for it to simply be lifted for dumping out the dried contents using an adjacent means, such as a hydraulic lifter 26 associated with a pivot axis 28. In such case, the arrangement of the drain 18 would be such that it may be easily detached or otherwise disconnected from any associated line(s) for the vacuum or liquid takeaway.

In order to speed the drying process, a system including at least one of the containers 10 may include a dryer 30 for drying the remaining product once a substantial portion of the liquid is removed. In the embodiment shown in the drawing figures, the dryer 30 is associated with a conveyor 32 on which the remaining substantially dried product is placed, and may pass through a heater 34. Preferably, the infeed end of the conveyor 32 is positioned such that the product can be dumped directly on it as a result of the reorientation of the container 10 using the lifter 26.

In another system, and as shown with reference to FIG. 2*b*, two of the apparatus 10, 100 may be used in series. As shown, the containers 12, 112 may be in communication with common vacuum source, as well as possibly with one or more additional downstream vacuum sources (pump or motor), as shown in FIG. 2*b*. As noted above, an array or series of the containers 10 may also be used as necessary to simultaneously process a large amount of waste product in parallel, each operating independently.

Figure 5:
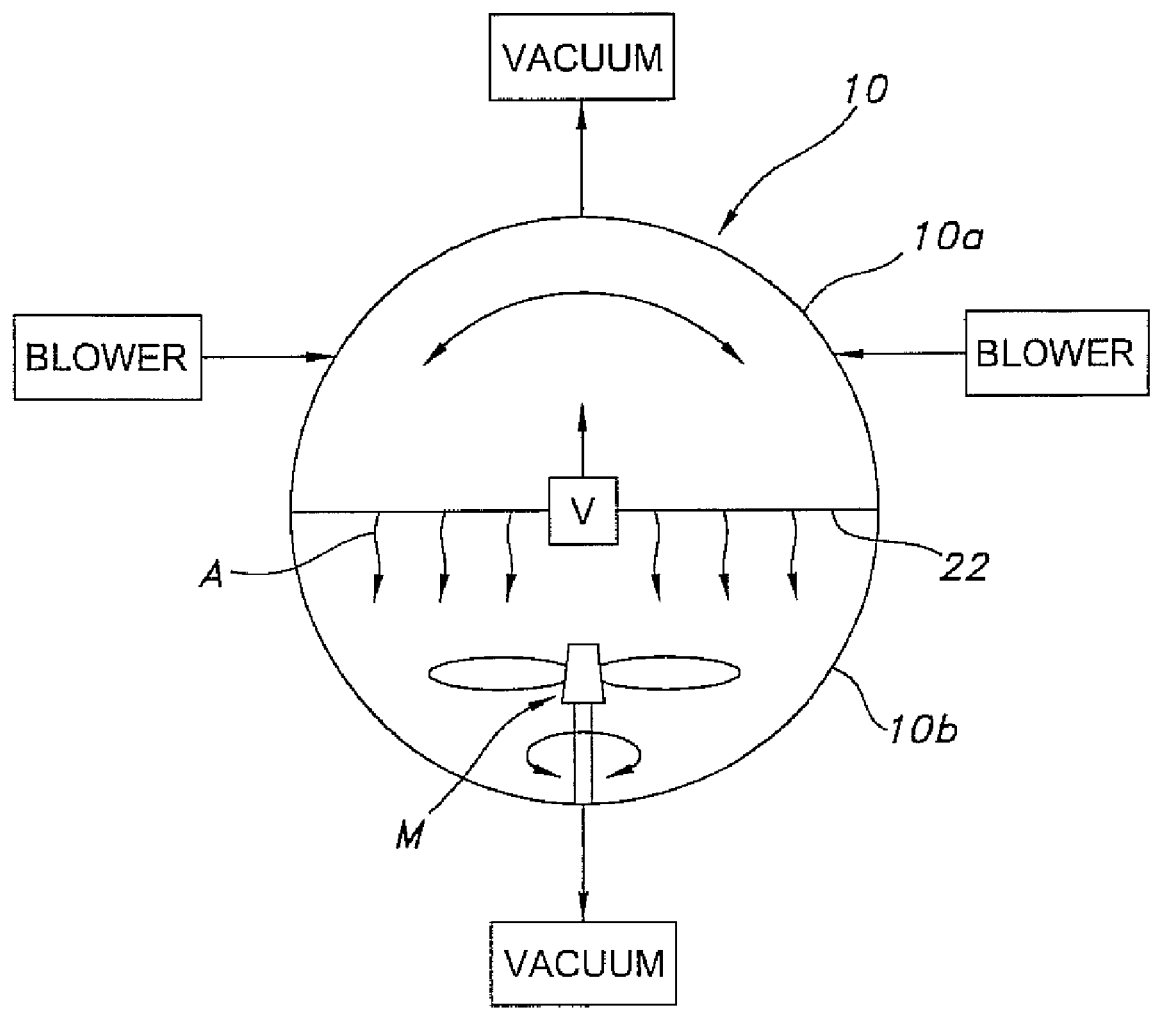
FIG. 5 is a schematic view illustrating an embodiment of the apparatus forming another aspect of the invention.

In an alternate embodiment, as shown in FIG. 5, the bowl-shaped container 10 may be of a clamshell design, formed of two hemispherical bowl-shaped upper and lower portions 10*a*, 10*b*, and thus forming a generally spherical body. The upper bowl portion 10*a* serving as the cover in this embodiment would have direct valves into the lower bowl portion 10*b* through any membrane 22, thus allowing for a closed system. When the valve is open, a vacuum may also be applied to the upper bowl portion 10*a* to remove dry materials from the lower portion 10*b*, while smaller blowers associated with the side walls circulate the dry material in a cyclone-like fashion while the vacuum is applied from the top. If used, the semi-permeable membrane 22 would thus allow some hot, dry air (note action arrows A) to pass into the lower bowl portion 10*b* when the vacuum is applied thereto.

With reference to FIG. 5, it is also shown that a mixer M or agitator, such as a rotatable mixing blade, may be provided to churn the dried yield in the lower bowl portion 10*b*. The upper bowl portion 10*a* may then be used as the vacuum point to remove the dried and loosened yield for recovery. In lieu of a mechanical mixer, it is possible in this or any of the embodiments disclosed to agitate the contents by reversing the vacuum motor in order to cause air to flow back through the conduits 16, the filter material 20, and any screen(s) 21 present (which may or may not require opening a pressure release valve, depending on the relative permeability of the membrane 22 used). This would essentially provide a sparging function to the container 12.

The foregoing description provides illustration of the inventive concepts. The descriptions are not intended to be exhaustive or to limit the disclosed invention to the precise form disclosed. Modifications or variations are also possible in light of the above teachings. For example, a positive pressure may be used to create the differential pressure in the chamber of the container, such as by pressurizing the space between the liquid-solid product and the cover (membrane). Additional modifications to the bowl-shaped container 10 can also be made, as disclosed in U.S. Published Patent Application No. 2002/0113014, the disclosure of which is incorporated herein by reference. The embodiments described above were chosen to provide the best application to thereby enable one of ordinary skill in the art to utilize the inventions in various embodiments and with various modifications as are suited to the particular use contemplated. All such modifications and variations are within the scope of the invention.

The invention claimed is:

1. An apparatus for removing liquid in a liquid and solids mixture comprising:
    a bowl-shaped, rigid container having an upper portion, a lower portion, and a curved sidewall forming a chamber for receiving the liquid and solids mixture, the container including a plurality of conduits extending radially outwardly along an inner portion of the sidewall;
    a filter separating the conduits from the liquid solids mixture in the chamber; and
    means for creating a pressure differential in the chamber;
    wherein the pressure in said chamber causes at least liquid to flow from the liquid and solids mixture through the filter and conduits.

2. The apparatus of claim 1, further comprising a heater associated with the container for heating the liquid and solids mixture.

3. The apparatus of claim 1, further including a screen for separating the conduits from the filter.

4. The apparatus of claim 1, wherein each conduit is generally arcuate and tapers in width from adjacent the upper portion of the sidewall of the container to adjacent the lower portion of the container.

5. The apparatus of claim 1, wherein each conduit is generally arcuate and tapers in height from adjacent the lower portion of the sidewall of the container to adjacent the upper portion of the container.

6. The apparatus of claim 1, wherein the lower portion of the container includes a drain associated with the conduits.

7. The apparatus of claim 6, wherein the container further comprises a cover for substantially sealing the upper portion of the container to form the chamber, and wherein the means for creating a pressure differential in the chamber comprises a vacuum pump associated with the drain.

8. The apparatus of claim 7, wherein the cover comprises a pliable impermeable or semi-permeable membrane.

9. The apparatus of claim 7, further including means for positioning the cover in contact with the sidewall adjacent the upper portion of the container.

10. The apparatus of claim 1, wherein the container is generally hemispherical in shape.

11. The apparatus of claim 1, wherein the container is generally spherical in shape.

12. The apparatus of claim 1, further including means for emptying the contents of the container.

13. The apparatus of claim 1, further including a dryer for drying the material in or from the container.

14. The apparatus of claim 1, further including a mixer for mixing the material in the container.

15. The apparatus of claim 1, wherein the container is portable and further including a vehicle for transporting the container.

16. A system including a plurality of the apparatus of claim 1 arranged in series.

17. An apparatus for removing liquid in a liquid and solids mixture, comprising:
    a bowl-shaped, rigid container having a curved sidewall and a cover together forming a chamber for receiving the liquid and solids mixture, the container including a plurality of arcuate, tapered conduits extending radially outwardly along an inner portion of the sidewall;
    a filter separating the conduits from the liquid and solids mixture in the chamber; and
    a pump for creating a pressure differential in the chamber;
    wherein the pressure in said chamber causes at least liquid to flow from the mixture through said filter and conduits.

18. A method for reducing the amount of liquid in a liquid and solids mixture, comprising:
    providing the mixture to a chamber in a bowl-shaped container including a plurality of arcuate conduits adjacent a filter separating the conduits from the liquid and solids mixture; and
    creating a pressure differential within the chamber to cause at least liquid to flow from the liquid and solids mixture through the filter into said conduits.

19. The method of claim 18, wherein the creating step comprises at least partially covering the container to form the chamber and applying a vacuum to the chamber.

20. The method of claim 18, further including the step of mixing the contents of the chamber.

* * * * *